US012643084B2

(12) United States Patent
Lammertyn et al.

(10) Patent No.: US 12,643,084 B2
(45) Date of Patent: *Jun. 2, 2026

(54) PATTERNING DEVICE

(71) Applicant: Katholieke Universiteit Leuven, K.U.Leuven R&D, Leuven (BE)

(72) Inventors: Jeroen Lammertyn, Neerijse (BE); Daan Witters, Geetbets (BE)

(73) Assignee: Katholieke Universiteit Leuven, K.U.Leuven R&D, Leuven (BE)

( * ) Notice: Subject to any disclaimer, the term of this patent is extended or adjusted under 35 U.S.C. 154(b) by 1109 days.

This patent is subject to a terminal disclaimer.

(21) Appl. No.: 17/699,617

(22) Filed: Mar. 21, 2022

(65) Prior Publication Data

US 2022/0203325 A1 Jun. 30, 2022

Related U.S. Application Data

(63) Continuation of application No. 16/886,486, filed on May 28, 2020, now Pat. No. 11,278,859, which is a continuation of application No. 15/643,732, filed on Jul. 7, 2017, now Pat. No. 10,695,737, which is a continuation of application No. 14/374,499, filed as application No. PCT/BE2013/000004 on Jan. 24, 2013, now abandoned.

(60) Provisional application No. 61/725,268, filed on Nov. 12, 2012, provisional application No. 61/592,399, filed on Jan. 30, 2012.

(30) Foreign Application Priority Data

| | | |
|---|---|---|
| Jan. 24, 2012 | (GB) | 1201277 |
| Oct. 23, 2012 | (GB) | 1218994 |
| Oct. 23, 2012 | (GB) | 1218995 |

(51) Int. Cl.
| | |
|---|---|
| *B01J 19/00* | (2006.01) |
| *B01L 3/00* | (2006.01) |
| *B82Y 30/00* | (2011.01) |

(52) U.S. Cl.
CPC ..... *B01J 19/0046* (2013.01); *B01L 3/502707* (2013.01); *B01L 3/502792* (2013.01); *B01J 2219/00382* (2013.01); *B01J 2219/00387* (2013.01); *B01J 2219/00619* (2013.01); *B01J 2219/0065* (2013.01); *B01L 2200/0668* (2013.01); *B01L 2200/0673* (2013.01); *B01L 2200/142* (2013.01); *B01L 2300/0636* (2013.01); *B01L 2300/0816* (2013.01); *B01L 2300/161* (2013.01); *B01L 2400/0427* (2013.01); *B01L 2400/043* (2013.01); *B82Y 30/00* (2013.01)

(58) Field of Classification Search
None
See application file for complete search history.

(56) References Cited

FOREIGN PATENT DOCUMENTS

| | | |
|---|---|---|
| WO | 01/20593 A1 | 3/2001 |
| WO | 2010/025310 A2 | 3/2010 |
| WO | 2011/056872 A2 | 5/2011 |
| WO | 2013/110146 A2 | 8/2013 |

OTHER PUBLICATIONS

Witters et al., "Biofunctionalization of electrowetting-on-dielectric digital microfluidic chips for miniaturized cell-based applications," Lab Chip 2011, 11:2790-2794, with 2 pages of Supplementary Information, published online Jul. 1, 2011. (Year: 2011).*

(Continued)

*Primary Examiner* — Kaijiang Zhang
(74) *Attorney, Agent, or Firm* — Edward J. Baba; Andrew R. Guzman; Bozicevic, Field & Francis LLP

(57) ABSTRACT

A miniaturized, automated method for controlled printing of large arrays of nano- to femtoliter droplets by actively transporting mother droplets over hydrophilic-in-hydrophobic ("HIH") micropatches. The technology uses single or double-plate devices where mother droplets can be actuated and HIH micropatches on one or both plates of the device where the droplets are printed. Due to the selective wettability of the hydrophilic micropatches in a hydrophobic matrix, large nano- to femtoliter droplet arrays are created when mother droplets are transported over the arrays. The parent droplets are moved by various droplet actuation principles. Also, a method using two plates placed one top another while being separated by a spacer. One plate is dedicated to confirming and guiding parent droplets by using hydrophilic patches in a hydrophobic matrix, while the other plate contains HIH arrays for printing of the droplets. When the parent droplet guidance plate is rotated over the plate dedicated to printing of nano- to femtoliter droplets, the droplets are dispensed inside the HIH array utilizing their selective wettability. The methods allow the parent droplets to move over the HIH arrays many times, providing advantages for performing bio-assays or miniaturized materials synthesis in nano- to femtoliter sized droplets. With controlled evaporation of the dispensed droplets of solution, large arrays of printed material can be generated in seconds. The methods provide a nano- to femtoliter droplet printing technique for a wide variety of applications, e.g., protein- or cell-based bio-assays or printing of crystalline structures, suspensions of nanoparticles or microelectronic components.

1 Claim, 6 Drawing Sheets

(56) References Cited

OTHER PUBLICATIONS

Witters et al., "Automated Adherent Cell Assays Using Digital Microfluidics," Proceedings of the 2nd European Conference on Microfluidics—Microfluidics 2010—Toulouse, Dec. 8-10, 2010. (Year: 2010).*

Bacher "Nucleic Acid Selection as a Tool for Drug Discovery," Drug Discovery Today 3(6):265 273, 1998).

Bai et al., "Photocleavage of a 2 nitrobenzyl linker bridging a fluorophore to the 5' end of DNA," Proc. Natl. Acad. Sci. U.S.A., 2003, vol. 100(2), p. 409 13).

Bunka et al., Erratum to "Development of aptamer therapeutics" Curr. Opin. Pharmacol. 10 (2010) 557-562].

Cheglakov et al., "Increasing the Complexity of Periodic Protein Nanostructures by the Rolling-Circle-Amplified Synthesis of Aptamers" Angew Chem. Int. Ed. Engl. 2008; 47(I):126 30).

Cheng et al. "Nanopatterning self-assembled nanoparticle superlattices by moulding microdroplets", Nature Nanotech. 2008, 3:682.

Cho et al., "Creating, Transporting, Cutting, and Merging Liquid Droplets by Electrowetting Based Actuation for Digital Microfluidic Circuits," Journal of Microelectromechanical Systems, vol. 12, No. 1, Feb. 2003, pp. 70 80.

Gold et al., "Diversity of Oligonucleotide Functions," Annu. Rev. Biochem. 64:763 97.1995.

International Search Report for International Application No. PCT/BE13/000004, mailed Aug. 14, 2013, 5 pages.

International Written Opinion for International Application No. PCT/BE2013/000004, mailed Aug. 14, 2013, 4 pages.

Kan et al., Isolation and detection of single molecules on paramagnetic beads using sequential fluid flows in microfabricated polymer array assemblies, The Royal Society of Chemistry, Lab Chip, 2012, pp. 977-985, vol. 12.

Iino et al., "Femtoliter microdroplet array device for single-molecule digital enzyme-linked immunosorbent assay," Proceedings of 15th International Conference on Miniaturized Systems for Chemistry and Life Sciences, Oct. 2-6, 2011, vol. 1, pp. 24-26.

Liu et al., "Rolling Circle DNA Synthesis:? Small Circular Oligonucleotides as Efficient Templates for DNA Polymerases" J. Am. Chem. Soc. 1996; 118(7):1587 1594.

Malic et al., "Biochip functionalization using electrowetting-on-dielectric digital microfluidics for surface plasmon resonance imaging detection of DNA hybridization," Biosens. Bioelectron. 2009, 24:2218-2224. (Year: 2009).

PCT International Search Report and Written Opinion, PCT/BE2013/000004, dated Aug. 14, 2013.

Sakakihara et al., "A single-molecule enzymatic assay in a directly accessible femtoliter droplet array," Lab Chip 2010, 10:3355-3362.

Siddiqui et al. (2005), "Pegaptanib: in exudative age related macular degeneration," Drugs 65:1571 1577; discussion 1578 1579.

Stephens et al., "Early Stages of Crystallization of Calcium Carbonate Revealed in Picoliter Droplets," J. Am. Chem. Soc. 2011, 133:5210-5213, published online Mar. 22, 2011, with 4 pages (S1-S4) of Supporting Information.

Su et al. "Patterning Crystal Arrays: 'Clinging-Microdroplet' Patterning Upon High-Adhesion, Pillar-Structured Silicon Substrates" Adv. Funct. Mater. 17/2011, 21:3297.

Vergauwe et al "Improving the Analytical Performance of a Digital Lab-on-a-Chip for Detection and Quantification of Ig-E" Proceedings of the 2nd European Conference on Microfluidics—Microfluidics 2010—Toulouse, Dec. 8-10, 2010.

Witters et al "Automated Adherent Cell Assays Using Digital Microfluidics" Proceedings of the 2nd European Conference on Microfluidics—Microfluidics 2010—Toulouse, Dec. 8-10, 2010.

Witters et al., Biofunctionalization or electrowetting-on dielectric digital microfluidic chips for miniaturized cell-based applications, The Royal Society of Chemistry, Lab Chip, 2011, pp. 2790-2794, vol. 11.

* cited by examiner

Plate containing hydrophilic-in-
hydrophobic arrays dedicated to
printing of nano- to femtoliter droplets Plate containing larger hydrophilic pathes
in hydrophobic matrix dedicated to
guiding of parent droplets Both plates on top of each other Side view

PATTERNING DEVICE

CROSS-REFERENCE TO RELATED APPLICATIONS

This application is a continuation of U.S. patent application Ser. No. 16/886,486, filed May 28, 2020, which will issue as U.S. Pat. No. 11,278,859 on Mar. 22, 2022, which is a continuation of U.S. patent application Ser. No. 15/643,732, filed Jul. 7, 2017, now U.S. Pat. No. 10,695,737 issued Jun. 30, 2020, which is a continuation of U.S. patent application Ser. No. 14/374,499, filed Jul. 24, 2014, abandoned, which is a national phase entry under 35 U.S.C. § 371 of International Patent Application PCT/BE2013/000004, filed Jan. 24, 2013, designating the United States of America and published in English as International Patent Publication WO2013/110146 A2 on Aug. 1, 2013, which claims the benefit under Article 8 of the Patent Cooperation Treaty to Great Britain Application Serial No. 1201277.9, filed Jan. 24, 2012, United States Provisional Application Ser. No. 61/592,399, filed Jan. 30, 2012, Great Britain Application Serial No. 1218994.0, filed Oct. 23, 2012, Great Britain Application Serial No. 1218995.7, filed Oct. 23, 2012, and U.S. Provisional Application Ser. No. 61/725,268, filed Nov. 12, 2012, the disclosure of each of which is hereby incorporated herein in its entirety by this reference.

TECHNICAL FIELD

The application relates generally to a patterning device for printing arrays of nano- to femtoliter droplets that can lead to deposition of crystals, micro- and nanoparticles and solid-state materials and on chip detection or analysis of the crystals, nanoparticles and solid-state materials or of their activities in a reaction. More particularly, the disclosure involves a flexible high-throughput method for the printing of crystals (e.g., crystals of salts, crystalline structures or mesoporous structures and carbon nanotubes) and printing of biomolecules such as proteins and polynucleotides (e.g., DNA) that can be linked to micro- or nanoparticles, by a system of depositing small liquid volumes in the form of arrays of nano- to femtoliter droplets by moving parent droplets over hydrophilic-in-hydrophobic micropatches or microwells such that the parents droplets release nano- to femtoliter droplets on each such micropatch or microwell it contacts. This method can be applied to high-throughput printing of the above materials. Single crystals or micro- and nanoparticles can be formed or deposited as a single particle or a single crystal can be deposited per micropatch or microwell in an array of micropatches or microwells. In particular more specific embodiments of the disclosure concern a system and method for crystal and nanoparticle patterning by a specific microfluidic synthesis and a digital microfluidic apparatus.

BACKGROUND

Several documents are cited throughout the text of this specification. Each of the documents herein (including any manufacturer's specifications, instructions, etc.) are hereby incorporated by reference; however, there is no admission that any document cited is indeed prior art of the disclosure.

For a wide variety of applications, it is of high interest to dispose of a method that can generate large arrays of very small volumes of samples and reagents in a high-throughput context. This is not only true for situations involving expensive substances such as proteins, but also for applications that are in need of a method that can print very low liquid volumes for miniaturization purposes of certain components or increasing the sensitivity of analytical techniques. Moreover, it is desirable to dispose of efficient methods that are able to print large amounts of small liquid droplets on planar or curved surfaces or inside microwells, slides, chips or membranes.

More specifically, for performing analysis of biomolecules in nano- to femtoliter volumes is beneficial for detection of the molecules, as bio-assays that generate fluorophores in nano- to femtoliter volumes confine the generated fluorophores when these nano- to femtoliter volumes are sealed in oil.

For different applications, it is desirable to tune the distance between the different elements of the created array. Densely packed arrays (microarrays), for instance, permit many reactions to be monitored in parallel, which is beneficial for miniaturization, saving time, volume and increasing cost-effectiveness of the used method. These reactions can be binding events of target molecules to capture molecules such as, but not limited to, DNA-DNA interactions, DNA-protein interactions, enzymatic reactions, and immunological assays or for performing digital enzyme-linked immunosorbent assay (digital ELISA) or digital polymerase chain reaction (digital PCR).

For several applications, it is desirable to print droplets on planar or curved surfaces exhibiting different contact angles with the surface onto which the droplets are printed. Therefore, the nature of the surface is tuned in order to print arrays of droplets with the desired size or volume.

The shape and size of the printed liquid volume is of interest as well. Therefore, it is highly desirable to dispose of a method that cannot only determine the size of the different droplets that are to be printed, but also the shape in which the different small liquid volumes are deposited.

Typical methods for printing large arrays of small liquid volumes make use of inkjet printing devices or multichannel micropipette-devices that print several small droplets at the same time. Usually, these methods are restricted in minimum amount of volume that they are able to dispense and the throughput that is achieved. Moreover, inkjet systems are usually expensive and the printing of very large arrays is time-consuming.

Considering the above, there is a need in the art to dispose of a method that can generate very small liquid volumes in the nano- to femtoliter range with very high-throughput and on a fast and cost-effective way. Preferably, the apparatus should be easy to use, flexible and able to print many different substances as nano- to femtoliter arrays with liquid volumes assuming the desired shape and size.

An application of the device of the disclosure, to print substances as nano- to femtoliter arrays, is the printing of complementary strands in an array structure on a chip surface. The complementary strands can be positioned in an array on the digital microfluidic chip via the printer apparatus of the disclosure. The complementary strands form hybridization probes to bind libraries of pre-designed oligonucleotide libraries in an array structure on a digital microfluidic chip. Consequently, on-chip amplification of the library is carried out, for instance, using rolling-circle amplification and hereafter on-chip target binding is obtained after exposure of the amplified oligonucleotide to possible binding targets. In an embodiment of the disclosure these processes are automated.

Provided are methods and apparatus for efficient selection of certain aptamers as binders for defined targets. Aptamers are short single stranded DNA or RNA oligonucleotides that fold into well-defined three-dimensional structures allowing the binding of target molecules. They possess the molecular recognition properties of monoclonal antibodies in terms of high affinity and specificity. Thanks to these properties, the use of aptamers in different fields has become extremely dynamic in the past few years. Functional aptamers have been widely integrated as target recognition molecules into different nanomaterials, providing a new type of biosensors, known as "aptasensors." Furthermore, because of their limited size, which is typically up to 80 nucleotides, aptamers have low immunogenicity and toxicity. This property has been useful in the field of therapeutics. At present, the vascular endothelial growth factor (VEGF)-directed RNA aptamer (M. A. Siddiqui and G. M. Keating (2005), "Pegaptanib: in exudative age-related macular degeneration," *Drugs* 65:1571-1577; discussion 1578-1579) is the only therapeutic aptamer that has been approved for the treatment of age-related macular degeneration. Several anticoagulant and antithrombotic aptamers are currently in clinical trials (Bunka et al., *Curr. Opin. Pharmacol.* 2010 Oct. 10 (5):557-62. Epub 2010 Jul. 17). Aptamers are also being explored in targeted drug delivery or for long-life treatment when selected against intracellular targets and stably expressed within a cell (Bunka and Stockley, 2006). The relatively fast selection process of the specific aptamers and the inexpensive synthesis makes the aptamer useful alternatives for monoclonal antibodies. These nucleic acids can be easily synthesized, readily manipulated, and can be stored for over a long time. These benefits make nucleic acids more attractive biotechnology tools than their counterpart of proteins, antibodies.

Aptamers are generally selected using in vitro selection method, termed SELEX (Gold et al., "Diversity of Oligonucleotide Functions," *Annu. Rev. Biochem.* 64:763-97.1995; Bacher and Ellington, "Nucleic Acid Selection as a Tool for Drug Discovery," *Drug Discovery Today* 3(6): 265-273, 1998). SELEX is based on iterative cycles of collecting, from a synthetic random library, candidate aptamers with the best binding affinity towards the target molecule. After incubation of the target molecule with the library, free nucleic acids strands are separated by the bound ones typically by capillary electrophoresis. Despite SELEX has been largely used to identify novel aptamers, the isolation process remains non-trivial. The classical selection procedure is still lengthy, with weeks to months needed to generate a new aptamer and requiring multiple rounds of selection. Furthermore, kinetic biases are known limitations of the system because the single representation of a given aptamer sequence among the billions of available sequences not only requires cyclic enrichment to isolate that particular single copy but also increases the probability that a certain aptamers molecule will never enter in contact with the target molecule. Moreover, although a synthetic library theoretically contains 1016 random single stranded DNA/RNA sequences, practically they are never all analyzed because of the limited amount of aptamers-target mixture that can be loaded on capillary electrophoresis. Finally, the amount of target molecule needed to perform all the selection cycles is rather high, rendering difficult the isolation of aptamers against expensive molecules (e.g., human growth factors) or targets that are available in limited amounts (recombinant proteins).

DISCLOSURE

Described herein is a method for semi-automatic, consistent, and rapid single-step aptamer selection and isolation based on a digital microfluidic chip. In certain embodiments, this method involves the use of a printing device of the disclosure for efficiently creating an array of fixed nucleotides.

Some embodiments of the disclosure are set forth in claim format directly below:

1. A method of printing a pattern or an array of nano- to femtoliter volume liquid droplets, characterized in that the method comprises moving or transporting a micro- or mililiter-sized parent droplet over a hydrophilic-in-hydrophobic pattern forming an array of hydrophilic elements in or onto a hydrophobic surface so that the parent droplet is divided into nano- to femtoliter droplets by releasing a divisional nano- to femtoliter droplet per hydrophilic element, which the parent droplet touches so creating a printed nano- or femtoliter droplet array or pattern.

2. The method of transporting or moving a parent droplet, according to embodiment 1, whereby the parent droplet is electrostatically transported with electrowetting-on-dielectric actuation over an array of conductive elements covered with a hydrophobic insulator.

3. The method of embodiment 2, whereby activation/deactivation of the conductive elements leads to transport of the parent droplet to the activated/deactivated conductive elements.

4. The method according to any one of the embodiments 1 to 3, whereby the distance between the separate hydrophilic elements of the created array is minimally the length of one element of these features.

5. The method of transporting a parent droplet, according to any one of the previous embodiments, comprising moving or transporting parent droplets sandwiched between two, by a spacer separated, plates of which one of these plates contains hydrophilic guidance patches or wells in a hydrophobic matrix for guiding a parent droplet over an hydrophilic-in-hydrophobic pattern to capture or deposit nano- to femtoliter droplets from the parent droplet and whereby the one plate is mechanically or manually rotated over the other plate.

6. The method of printing of arrays of nano- or femtoliter volume liquid droplets, according to any one of the embodiments 1 to 5, whereby the method is a high-throughput method of printing whereby several parent droplets are moved or transported in parallel over several regions containing hydrophilic-in-hydrophobic micropatterns.

7. The method of printing nano- to femtoliter-sized droplets, according to any one of the previous embodiments 1 to 6, whereby several (i.e., >1000) parent droplets are moved or transported over a pattern of hydrophilic-in-hydrophobic micropatterns in different sequences printing components or solutions from the parent droplets inside the hydrophilic elements of the array.

8. The method of printing of arrays of nano- or femtoliter volume liquid droplets, according to any one of the previous embodiments 1 to 6, whereby a larger parent droplet is transported over a hydrophilic-in-hydrophobic micropattern by means of electrowetting-on-dielectric based droplet actuation.

9. The method according to any one of the embodiments 1 to 8, whereby suspended particles or elements from a divisional droplet released from the parent droplet are printed inside the hydrophilic elements of the hydrophilic-in-hydrophobic pattern.

10. The method according to embodiment 9, whereby suspended particles or elements are captured and bound inside the hydrophilic elements of the hydrophilic-in-hydrophobic array and whereby the parent droplet that contains the suspended particles or elements is moved or transported over the hydrophilic-in-hydrophobic pattern at least one time to fill all hydrophilic elements with one or multiple particles from the parent droplet.

11. The method according to any one of the embodiments 9 to 10, whereby the hydrophilic element comprises a microwell, i.e., a well with diameter or length and depth of 1-1000 μm, or a micropatch with a depth of maximal 1 μm and a length or diameter of maximal 1000 μm.

12. The method according to any one of the embodiments 1 to 11, whereby the suspended particles in the parent droplet are micro- or nanoparticles with a diameter of 1 nm to 1000 μm that are deposited inside the hydrophilic elements.

13. The method according to any one of the embodiments 1 to 11, whereby the suspended micro- and nanoparticles are magnetic and their movement towards and inside of the hydrophilic elements is facilitated by placing a magnet underneath the hydrophilic elements and thereby accelerates trapping of magnetic particles in the hydrophilic elements and facilitating trapping of the magnetic particles in the hydrophilic elements.

14. The method according to any one of the embodiments 1 to 13, whereby all movement of parent droplets of deposition of nano- to femtoliter droplets is executed in an oil instead of an air environment such that the evaporation of parent droplets and the deposited nano- to femtoliter droplets is prevented.

15. The method according to any one of the embodiments 1 to 14, wherein the hydrophilic element is a microwell, a slide, a chip or a membrane.

16. The method according to any one of the embodiments 1 to 15, whereby the fluid comprises biomolecules such as proteins or other materials for the printing of solid-state materials.

17. The method according to any one of the embodiments 1 to 16, whereby the larger parent droplet has a microliter volume.

18. The method according to any one of the embodiments 1 to 16, whereby the larger parent droplet is divided into smaller nanoliter divisional droplets.

19. The method according to any one of the embodiments 1 to 16, whereby the larger parent droplet is divided into smaller pico- or femtoliter divisional droplets.

20. The method according to any one of the embodiments 1 to 19, whereby the liquid is an aqueous solution.

21. The method according to any one of the embodiments 1 to 19, whereby the liquid is an organic solvent.

22. The method according to any one of the embodiments 1 to 19, whereby the liquid is a solution comprising organic and inorganic building blocks.

23. The method according to any one of the embodiments 1 to 19, whereby the liquid is a suspension of micro- or nanoparticles and biological samples.

24. The method according to any one of the embodiments 1 to 23, whereby the shape and size of the printed divisional droplet is defined by the shape and size of the hydrophilic element.

25. The method according to embodiment 24, whereby the hydrophilic element is a microwell.

26. The method according to any one of the embodiments 9 to 10, whereby the loading efficiency of single or multiple particles are maximized to 98%, preferably 99% and more preferably 100% by moving a droplet of particle suspension multiple times over the array until all hydrophilic elements comprise particles or until all microwells are filled with particles.

27. The method according to any one of the embodiments 7 to 26, whereby droplets of particle suspensions are transported over the array of hydrophilic-in-hydrophobic microwells in an oil matrix, thereby preventing evaporation of the printed femtoliter droplets and the liquid surrounding the beads when being patterned in the microwells.

28. The method according to any one of the embodiments 1 to 27, whereby a parent droplet comprising a solute is divided into divisional nano- to femtoliter droplets and whereby the nano- to femtoliter droplet solutes are crystallized to their respective hydrophilic-in-hydrophobic elements and results in deposited single or multiple crystals originating from the solution in the parent droplet.

29. The method according to any one of the embodiments 1 to 28, whereby a bio-assay is performed in the printed nano- to femtoliter droplets in which fluorophores are generated in the bio-assay and confined to the nano- to femtoliter droplets when the droplet printing was performed in oil as in embodiment 14 and whereby the generated fluorescent signal is detectable with fluorescence microscopy.

30. The method according to embodiment 28, whereby this is applied to performing enzyme-linked immunosorbent assay or polymerase chain reaction inside the printed nano- to femtoliter droplets.

31. The method according to any one of the embodiments 29 or 30, whereby the bio-assays are performed on a printed particle from a parent droplet suspension or a parent droplet solute.

Some embodiments of the disclosure are set forth in embodiment format directly below:

1. An apparatus for generating arrays of nano- to femtoliter liquid samples on an open surface comprising a droplet actuation mechanism to move a parent fluid droplet along the path or on at least one zone of the path and comprises an array of hydrophilic elements on or in a hydrophobic layer or an array of hydrophilic elements comprised in hydrophilic-in-hydrophobic patterns characterized in that the apparatus is adapted to divide the larger parent droplet into smaller nano- or femtoliter droplets by multiple hydrophilic element that each sample a nano- or femtodroplet of the parent droplet that contacts the hydrophilic element.

2. The apparatus according to embodiment 1, whereby the distance between the separate hydrophilic elements of the created array is minimally the length of one element of these features adapted to divide the larger parent droplet into smaller nano- or femtoliter droplets by separate hydrophilic elements in contact with the parent droplet.

3. The apparatus according to embodiment 1, whereby the distance between the hydrophilic elements is at least the length or diameter of one said hydrophilic element to prevent pinning of the mother droplet to the surface of the device.

4. The apparatus according to any one of the previous embodiments 1 to 3, whereby the droplet actuating mechanism for transporting parent droplets is an electrowetting-on-dielectric based system that contains conductive structures or electrodes being covered by hydrophobic or superhydrophobic insulating layer adapted to transport single or multiple parent droplets of the same or different solutions on a path towards sites that contain the hydrophilic-in-hydrophobic micropatterns.

5. The apparatus according to any one of the previous embodiments 1 to 4, characterized in that it is a double-plate device whereby the parent droplet when on its path is sandwiched between two plates.

6. The apparatus according to embodiment 5, whereby the hydrophilic-in-hydrophobic patterns are placed on either or both of the plates of the device.

7. The apparatus according to any one of the previous embodiments 1 to 4, whereby the apparatus comprises a first and a second plates for sandwiching a parent droplet between the plates whereby the first and the second plate are separated by a spacer and whereby one of the plates contains large guidance hydrophilic patches in a hydrophobic matrix to guide the parent droplet and whereby the apparatus further comprises a mechanism to rotate the first plate over the second plate that contains the hydrophilic-in-hydrophobic pattern for deposition of nano- to femtoliter droplets from the parent droplet.

8. The apparatus according to any one of the previous embodiments 1 to 9, whereby the distance between both plates of the device is of a distance in a range between 1 micron and several hundreds of micrometers (e.g., 1 μm to 1000 μm).

9. The apparatus according to any one of the previous embodiments 4 to 8, whereby the droplet actuation system further comprises a system adapted to selectively activate and deactivate the conductive structures or electrodes by selectively activating or deactivating by applying a voltage to the conductive structures or electrodes and thereby generating and/or moving parent droplets on the surface.

10. The apparatus according to any one of the previous embodiments 1 to 9, whereby parent droplets are moved/transported by using electrowetting-on-dielectric actuation and are moved/transported over hydrophilic elements.

11. The apparatus according to any one of the previous embodiments 1 to 4, whereby droplets are moved on a single plate device whereby conductive elements are contained within this single plate or on double plate devices whereby droplets are sandwiched between a plate containing conductive elements and a second plate containing a hydrophobic layer and/or a reference electrode for electrowetting-on-dielectric actuation.

12. The apparatus according to any one of the previous embodiments 1 to 4, whereby there are no channel structures present and only open surfaces for droplet transport are used.

13. The apparatus according to any one of the previous embodiments 1 and 11, whereby when operational parent droplets are generated with electrowetting-on-dielectric actuation from on-chip fluid reservoirs whereby parent droplets are extracted by using the electrowetting-on-dielectric actuation or whereby parent droplets are generated by rotating patches dedicated to containing parent droplets away from a fluid reservoir.

14. The apparatus according to any one of the previous embodiments, the apparatus being characterized in that along the path or on at least one zone of the path it comprises an array hydrophilic elements on a hydrophobic layer or an array of hydrophilic elements comprised in hydrophilic-in-hydrophobic micropatterns adapted to divide a larger parent droplet into smaller nano- or femtoliter droplets or each hydrophilic element being adapted to sample a nano- or femtodroplet of the parent droplet while parent droplets are transported over the arrays many times.

15. The apparatus according to any one of the previous embodiments, whereby when operational a parent droplet moving over its path and contacting with hydrophilic elements of a hydrophilic-in-hydrophobic array releases nano or femtoliter droplet on the hydrophilic elements.

16. The apparatus according to any one of the previous embodiments, whereby the parent droplet has a volume of milli- to nanoliter.

17. The apparatus according to any one of the previous embodiments, whereby the hydrophilic element is a microwell inside the hydrophobic layer, a microline inside the hydrophobic layer, a nanoline inside the hydrophobic layer a chip or a membrane.

18. The apparatus according to any one of the previous embodiments 1 to 16, whereby the hydrophobic element forms planar or curved surfaces.

19. The apparatus according to any one of the previous embodiments 1 to 16, whereby the hydrophobic element on or in the hydrophobic layer has anyone of the following forms square, circle, rectangle, star or polygons.

20. The apparatus according to any one of the previous embodiments 1 to 16, whereby the hydrophobic element is a well or slit into the surface of the hydrophobic layer and has a geometrical form of a cube, a cylinder, a half sphere or a patch.

21. The apparatus according to any one of the previous embodiments, whereby the hydrophobic layer comprises fluoropolymers (such TEFLON-AF® or CYTOP®).

22. The apparatus according to any one of the previous embodiments 1 to 20, whereby the hydrophobic layer is composed of fluoropolymers (such TEFLON-AF® or CYTOP®).

23. The apparatus according to any one of the previous embodiments, whereby the hydrophobic layer comprises polydimethylsiloxane.

24. The apparatus according to any one of the previous embodiments 1 to 20, whereby the hydrophobic layer is composed of polydimethylsiloxane.

25. The apparatus according to any one of the previous embodiments, whereby the hydrophobic layer comprises gold modified with self-assembled monolayers exhibiting hydrophobic surface properties.

26. The apparatus according to any one of the previous embodiments 1 to 20, whereby the hydrophobic layer is composed of gold modified with self-assembled monolayers exhibiting hydrophobic surface properties.

27. The apparatus according to any one of the previous embodiments 1 to 3, whereby the parent droplet path is adapted to transport the parent droplet by opto-electrowetting.

28. The apparatus according to any one of the previous embodiments, further comprising a heating element in the plate of the device where the small droplets are printed (e.g., a Peltier element underneath the droplet printing sites, or the use of other heating elements underneath the printed droplets).

29. The apparatus according to any one of the previous embodiments, whereby the size of the hydrophilic elements (patches) is in the low micrometer (e.g., from 2 micron to 100 nm) to higher nanometer range (e.g., from 50 μm to 100 nm) to deposit droplet volumes in the attolitre range.

30. The apparatus according to any one of the previous embodiments 1 to 29, characterized in that when operational they move parent fluid droplets which comprise nanoparticle or microparticles.

31. The apparatus according to embodiment 1-30, characterized in that when operational parent fluid droplets are transported in an oil matrix instead of air, thereby preventing evaporation of the printed nano- to femtoliter droplets.

32. The apparatus according to any one of the embodiments 1 to 33, whereby the hydrophilic element is a microwell so that single or multiple nano- and microparticles are patterned by transporting droplets of suspended particles over the array hydrophilic-in-hydrophobic microwells so that the particles are deposited in the microwells.

33. The apparatus according to any one of the embodiment 1 to 32, whereby the apparatus further comprises a magnet or an assembly of magnets underneath the hydrophilic-in-hydrophobic micropatterns for attracting suspended magnetic particles.

Further scope of applicability of the disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from this detailed description. It is to be understood that both the foregoing general description and the following detailed description are exemplary and explanatory only and are not restrictive of the disclosure, as claimed.

BRIEF DESCRIPTION OF THE DRAWINGS

The disclosure will become more fully understood from the detailed description given herein below and the accompanying drawings which are given by way of illustration only, and, thus, are not limitative of the disclosure, and wherein.

DETAILED DESCRIPTION

Figure 1:
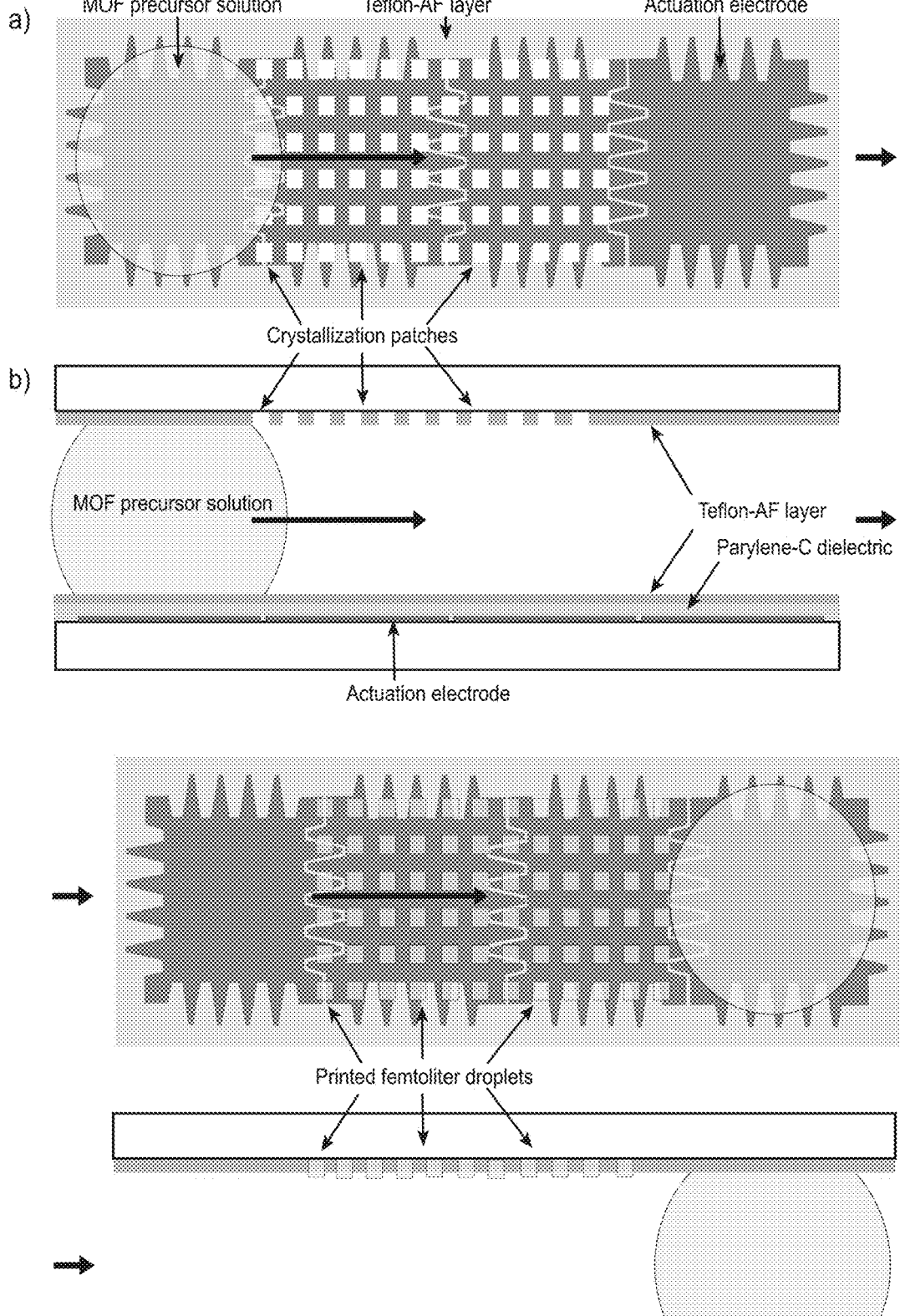
FIG. 1 is a schematic view showing an embodiment of the disclosure; Panel a) Top view (scale bar=700 μm) and Panel b) side view of a digital microfluidic chip designed for printing of nano- to femtoliter droplets. By transporting mother droplets over arrays of hydrophilic-in-hydrophobic micropatches, large arrays of nano- to femtoliter droplets are printed due to the selective wettability of the hydrophilic micropatches.

The following detailed description of the disclosure refers to the accompanying drawings. The same reference numbers in different drawings identify the same or similar elements. Also, the following detailed description does not limit the disclosure. Instead, the scope of the disclosure is defined by the appended claim(s) and equivalents thereof.

The following detailed description of the disclosure refers to the accompanying drawings. The same reference numbers in different drawings identify the same or similar elements. Also, the following detailed description does not limit the disclosure. Instead, the scope of the disclosure is defined by the appended claim(s) and equivalents thereof.

Several documents are cited throughout the text of this specification. Each of the documents herein (including any manufacturer's specifications, instructions, etc.) are hereby incorporated by reference; however, there is no admission that any document cited is indeed prior art of the disclosure.

The disclosure will be described with respect to particular embodiments and with reference to certain drawings but the disclosure is not limited thereto but only by the claim(s). The drawings described are only schematic and are non-limiting. In the drawings, the size of some of the elements may be exaggerated and not drawn to scale for illustrative purposes. The dimensions and the relative dimensions do not correspond to actual reductions to practice of the disclosure.

Furthermore, the terms "first," "second," "third," and the like in the description and in the claim(s), are used for distinguishing between similar elements and not necessarily for describing a sequential or chronological order. It is to be understood that the terms so used are interchangeable under appropriate circumstances and that the embodiments of the disclosure described herein are capable of operation in other sequences than described or illustrated herein.

Moreover, the terms top, bottom, over, under and the like in the description and the claim(s) are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising," used in the claim(s), should not be interpreted as being restricted to the means listed thereafter; it does not exclude other elements or steps. It is, thus, to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to the devices consisting only of components A and B. It means that with respect to the disclosure, the only relevant components of the device are A and B.

Reference throughout this specification to "one embodiment" or "an embodiment" means that a particular feature, structure or characteristic described in connection with the embodiment is included in at least one embodiment of the disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the disclosure, various features of the disclosure are sometimes grouped together in a single embodiment, figure, or description thereof for the purpose of streamlining the disclosure and aiding the understanding of one or more of the various inventive aspects. This method of disclosure, however, is not to be interpreted as reflecting an intention that the claimed disclosure requires more features than are expressly recited in each claim. Rather, as the following claim(s) reflect, inventive aspects lie in less than all features of a single foregoing disclosed embodiment. Thus, the claim(s) following the detailed description are hereby expressly incorporated into this detailed description, with each claim standing on its own as a separate embodiment of this disclosure.

Furthermore, while some embodiments described herein include some, but not other features included in other embodiments, combinations of features of different embodiments are meant to be within the scope of the disclosure, and form different embodiments, as would be understood by those in the art. For example, in the following claim(s), any of the claimed embodiments are used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

In the application, an array is a regular order or regular arrangement. In the application this may be an array of very small volumes (print arrays of droplets), or of hydrophilic elements, or of samples and reagents. It can be an array of nano- to femtoliter droplets, a nanoliter array or a femtoliter array. Or it can be a printed dot array (e.g., a nano-dot array or a femto-dot array). These arrays can be densely packed, for instance, in the form of a microarray such as a microarray of nanodots or as a microarray of femtodots or as a microarray of nanodroplets or of femtodroplets. These droplets can comprise a liquid, a sample-reagent combination, a solute or a liquid-suspension material combination.

One aspect of the disclosure concerns an apparatus that is capable of generating arrays of nano- to femtoliter liquid samples for a wide variety of liquids, including aqueous solutions, organic solvents, solutions consisting of organic and inorganic building blocks, suspensions of micro- or nanoparticles and biological samples, or organic solutions required for the printing of (organic) microelectronics. The apparatus includes a droplet actuation mechanism, which is active or passive, and an array of hydrophilic-in-hydrophobic micropatches, of which every hydrophilic micro- to nanopatch can contain a liquid sample.

The printing method of the disclosure concerns using mother droplets of the solution that is to be printed. These are actuated on a single planar or curved surface, or are sandwiched between two plates. On either or both of these plates, hydrophilic-in-hydrophobic micropatterns are present for the generation of nano- to femtoliter droplet arrays. The path that the mother droplet of solution follows, determines the pattern in which the nano- to femtoliter droplets will be printed on the surface of the apparatus.

In one embodiment of the disclosure, the droplet actuation mechanism is based on electrowetting-on-di electric based digital microfluidics. In this case, mother droplets are directly dispensed on the chip surface or are generated from an on-chip fluid reservoir from which smaller mother droplets are extracted by active dispensing. Subsequently, single or multiple mother droplets of the same or different solutions are transported towards sites that contain the hydrophilic-in-hydrophobic micropatterns. For single-plate chips this is on the plate in which the actuation electrodes are embedded, for double-plate devices, the patterns are placed on either or both of the plates of the device. In case of a double-plate device, the distance between both plates is usually of a distance in a range between one (1) micron to several hundreds of micrometers (e.g., 1 $\mu$m to 1000 $\mu$m). In the case of electrowetting-on-dielectric based transport of mother droplets, electrical signals (alternating current or direct current) are applied to a series of actuation electrodes, which can transport the droplets of a desired path in a sequential fashion.

Figure 2:
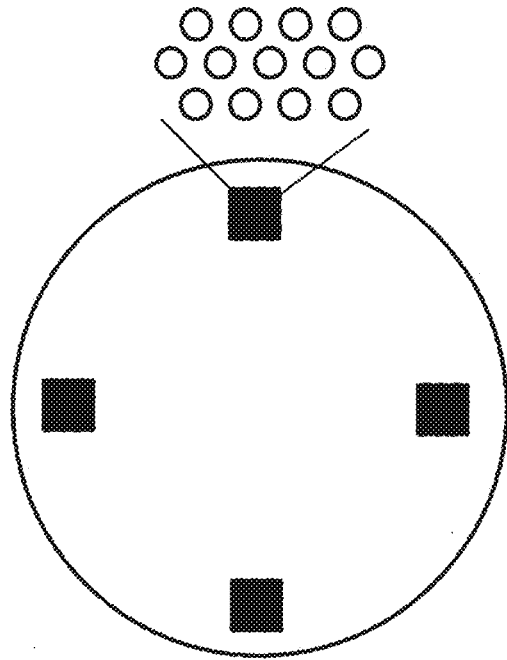
FIG. 2 represents a device where nano- to femtoliter droplets are printed by rotating two plates over each other. The plate on the left side contains many arrays which are hydrophilic-in-hydrophobic arrays dedicated to the printing of nano- to femtoliter droplets. The right plate contains large hydrophilic patches in a hydrophobic matrix dedicated to the positioning, confining and guiding of milli- to microliter sized parent droplets.
Figure 2:
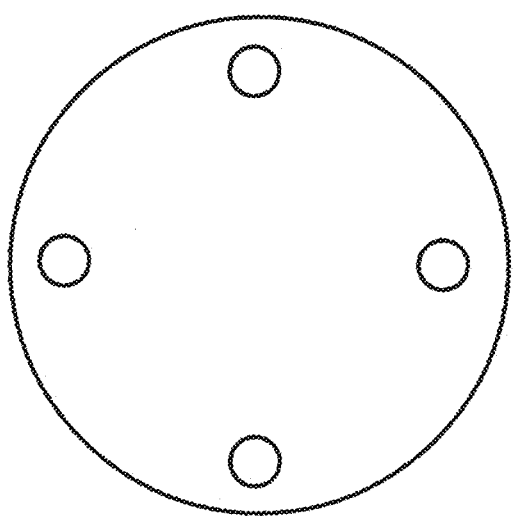
Figure 3:
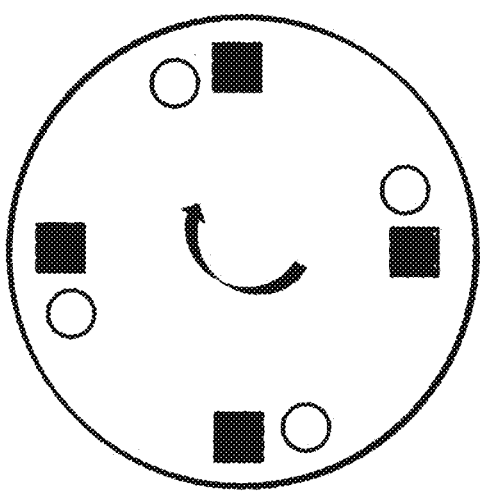
FIG. 3 is related to FIG. 2, and illustrates the case when both plates are placed on top of each other. A spacer separates both plates from each other, and the plate containing the parent droplets can be rotated over the other plate such that the parent droplets are guided over the array of hydrophilic-in-hydrophobic arrays in the other plate. The right-hand panel represents a side view when the parent droplet is placed on top of the array of hydrophilic-in-hydrophobic elements.
Figure 3:
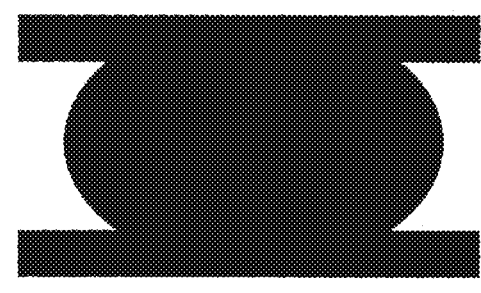

In another embodiment, the movement of parent droplets is accomplished by sandwiching the parent droplet between 2 plates, of which one plate is dedicated to the confinement of parent droplets, while the other contains the hydrophilic-in-hydrophobic micropatches that are dedicated to the printing of nano-femtoliter droplets (FIGS. 2 and 3). Parent droplets can be manually or automatically (with a pipetting robot) pipetted on the plate dedicated to confinement of parent droplets. Subsequently, both plates are placed and aligned on top of each other. When the one plate is rotated with respect to the other plate, parent droplets can be guided to move over the arrays of hydrophilic-in-hydrophobic elements on the other plate for the generation of nano-femtoliter droplets in the latter array. Parent droplets can as such be transported over the same array many times by rotating back and forth. Oil can also be pipetted between both plates in order to prevent evaporation of the parent droplets and the printed nano- to femtoliter droplets while still permitting the rotational movement of one of the plates. One of the plates can be moved mechanically by attaching it to an actuator, but the plate that is to be rotated can also be moved manually by the user of the device. In this latter case, the printing of nano- to femtoliter droplets occurs completely manually without linking the printing device to any moving part or energy-requiring system.

Other possible droplet actuation mechanisms comprises opto-electrowetting, in which droplets are routed with the help of light as an actuation force, the tilting of the device or apparatus in order to let the droplet roll in a desired direction, the use of pressure to move the droplet in a desired direction, or the use of surface tension or capillary forces that force mother droplets in a certain direction by guiding mother droplets along a path of preferential wettability.

The hydrophilic-in-hydrophobic micropatterns are generated in the hydrophobic surface of the presented device on several ways. One way to generate these micropatches is by using standard photolithographic techniques and microfabrication techniques. Other possibilities comprise depositing a Parylene-C membrane on top of the hydrophobic chip surface, and subsequently patterning the Parylene-C membrane and the underlying hydrophobic layer by using photolithography and microfabrication techniques. Other microfabrication techniques such as soft lithography can also be used for generating hydrophilic patches on top of the hydrophobic coating.

The patches onto which nano- to femtoliter sized droplets are dispensed are micro- to nanowells fabricated inside the hydrophobic layer such as mentioned above, or are local surface modification of the hydrophobic layer such that the wettability of the treated regions is modified. This is due to chemical modification of the surface or physical modification such as a modification of the surface roughness.

The contact angle of the hydrophilic-in-hydrophobic micropatches can be altered by changing the nature of the surface onto which the hydrophobic coating is placed and patterned. Otherwise, the nature of the hydrophilic patches can also be altered after the micropatterns are fabricated. One example is the modification of the gold micropatches by submerging the patterned substrates in different solutions of self-assembling monolayers.

The shape of the patterned features can assume different forms, including but not limited to, circles, squares, rectangles, stars or polygons. Moreover, the apparatus is applied for the printing of lines and wires, if the intended application needs such features. In this case, single or multiple lines and wires of liquid are patterned be transporting the mother droplets over these different features.

The hydrophobic coating into which the hydrophilic-in-hydrophobic micropatterns are fabricated can be of different nature, including hydrophobic fluoropolymers such TEFLON-AF® or CYTOP®, or are composed of other hydrophobic materials such as PDMS or gold modified with self-assembled monolayers exhibiting hydrophobic surface properties.

The apparatus can also be used for post-modification of the different printed substances on the device surface. Because the inherent nature of the micropatterned surfaces to confine liquid nano- to femtoliter droplets to the hydrophilic micropatches, other mother droplets are transported over these micropatches after the initial solution has been printed. This makes post-modification of the printed substances easy as no extra alignment is necessary. As such, multiple layers of printed substances are applied in a very high-throughput manner. There is no need for special alignment techniques as the liquid is always strictly confined to the more wettable (hydrophilic) patches.

The form of the printed arrays can subsequently be determined by choosing the appropriate path for the mother droplet. As such, the pattern of nano-to femtoliter droplets is generated on a flexible way, and enables the fast generation very large arrays of nano- to femtoliter droplets in very short time notice.

The distance between the different features of the hydrophilic-in-hydrophobic micropatterns are chosen to a certain extent. The minimum distance between different elements of these arrays should be minimally the length of one element of these features to prevent pinning of the mother droplet to the surface of the device. The maximum distance between the different features can be chosen freely.

When certain parts of the patterned hydrophilic-in-hydrophobic micropatches are not to be filled with nano- to femtoliter droplets, different approaches are applied in order to prevent liquid printing in these areas when they are on the path to be addressed by the mother droplets. As such, deviations of the path of the mother droplet are applied in order to leave these micropatterns free of liquid. In double-plate devices, the plate containing the hydrophilic-in-hydrophobic micropatches are temporarily lifted from the other plate and replaced on the device for continuing the patterning process.

Although the evaporation of printed femtoliter droplets is very quick on its own, incorporating a heating element in the plate of the device where the small droplets are printed can accelerate it. This may be achieved in several ways, including the use of a Peltier element underneath the droplet printing sites, or the use of other heating elements underneath the printed droplets. When the size of the hydrophilic patches is chosen small enough, i.e., in the low micrometer (e.g., from 2 micron to 100 nm) to higher nanometer range, even smaller liquid volumes are deposited. The deposited volumes are then in the attoliter range, although this is still dependent on the depth of the hydrophilic micropatches and the contact angle of the bottom of the hydrophilic micropatches. By designing the hydrophilic micropatches such that their depth is in the nanometer range, and the size in the lower micro- to higher nanometer range, attoliter droplet dispensing becomes possible.

Also provided are embodiments of producing arrays of crystalline materials that can be deposited as single or multiple crystals inside hydrophilic patches or hydrophilic microwells. For example, demonstrated is that the first microfluidic method for accurately depositing monodisperse individual crystals that can be of many different natures, for example, metal-organic framework crystals, thereby enabling unprecedented high-throughput, yet flexible single crystal patterning.

Existing techniques for crystal printing exhibit several restrictions such as limited throughput and patterning area, high equipment costs, long processing times, or limited flexibility. A technique that can print large arrays of monodisperse crystals with high-throughput, high flexibility, and low cost in a short time period is, therefore, of high interest.

Figure 4:
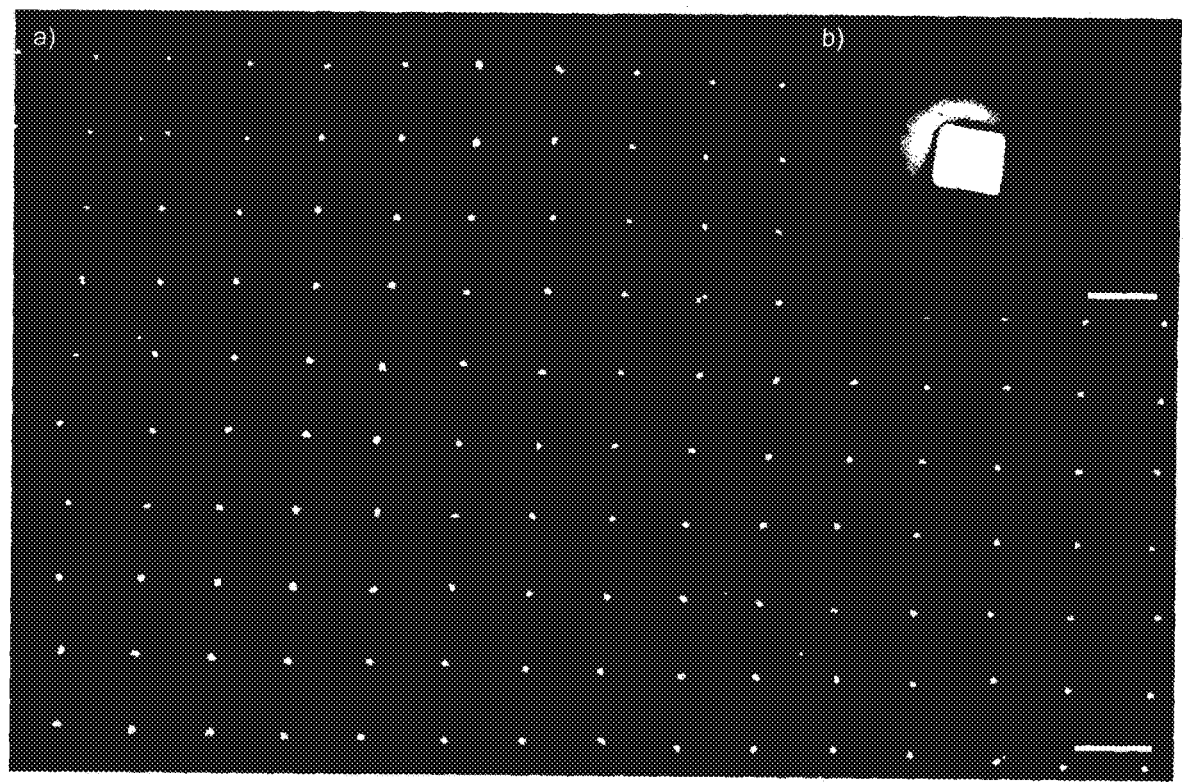
FIG. 4 represents a photograph of printed single NaCl crystals inside of an array of hydrophilic-in-hydrophobic elements.
Figure 5:
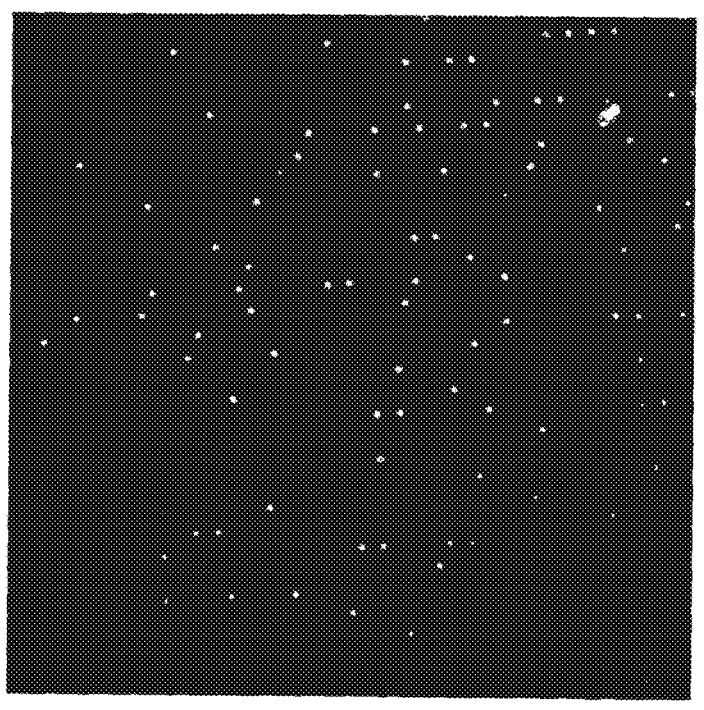
FIGS. 5 through 7 are photographs displaying the deposition of single microparticles deposited in an array of hydrophilic microwells in a hydrophobic TEFLON® layer. The microwells capture and hold single microparticles and arrays of such micropatches can be used to separate microparticles. The photograph displays the arrays of micropatches wherein the white dots are single microparticles which are each captured by or in separate microwells. The drop comprising several nanoparticles had been transported over the microwells to release one microparticle at some of the patches on this way generating an array of single nanoparticles.
Figure 6:
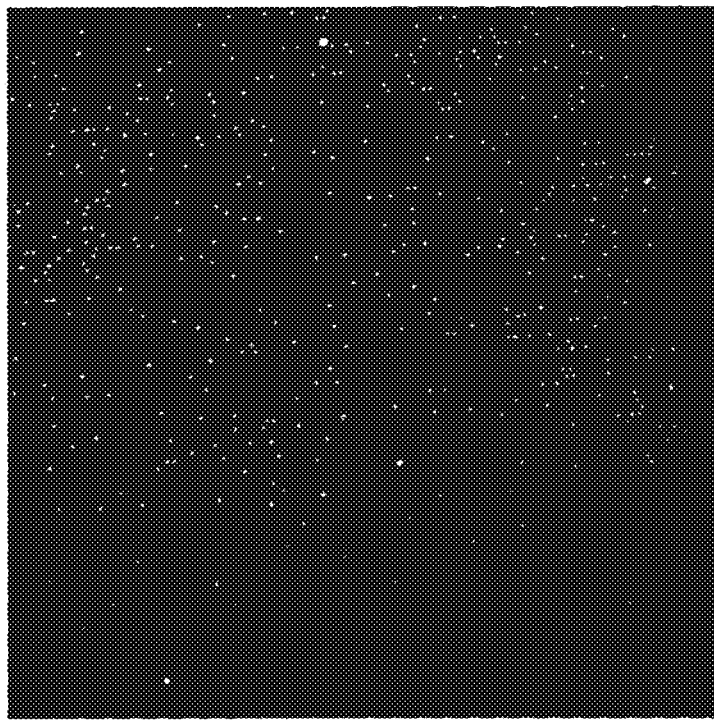
Figure 7:
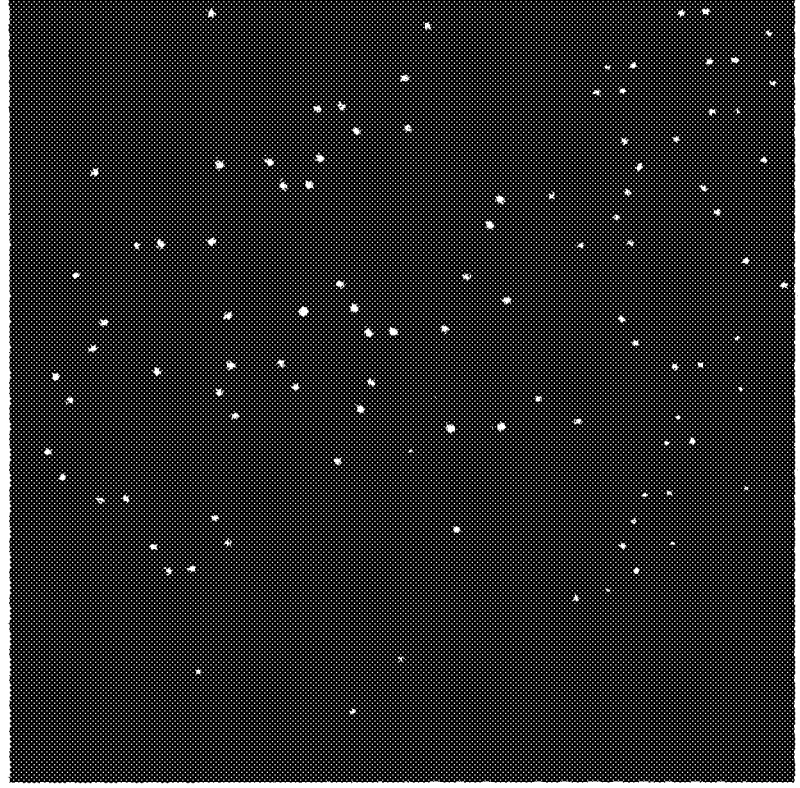

Due to the double-plate chip design, the top plate of the device can easily be removed and separated from the bottom plate after printing, allowing post-treatments with the optimal conditions required for crystal formation, such as high temperature treatments. Initial evaluation experiments with a 5 M aqueous sodium chloride (NaCl) solution demonstrate the proof-of-principle of on-chip crystal printing. The top plate of the chip consisted of a glass wafer with a thin layer of indium tin oxide (ITO), onto which a hydrophobic TEFLON® amorphous fluoropolymer (TEFLON-AF®) layer was coated and patterned by microfabrication techniques to form the hydrophilic-in-hydrophobic micropatches. First, a 400 nL mother droplet of NaCl was dispensed on-chip from a fluid reservoir and subsequently transported over an array of 20 μm×20 μm hydrophilic micropatches on top of a linear array of 4 actuation electrodes (1.4 mm×1.4 mm each). As such, 6400 femtoliter droplets were printed before removing the top plate of the device and allowing these droplets to evaporate in atmospheric conditions. Single NaCl crystal arrays were observed, as can be seen from scanning electron microscope (SEM) images in FIG. 4, showing a very high single-crystal per micropatch resolution.

Due to the modular approach, the electronics in the bottom plate required for actuation of mother droplets are separated from the plate onto which femtoliter droplets are printed for crystal fabrication, allowing the more expensive bottom plate to be reused for many printing runs. The top plate is cheap, and is easily followed by other top plates that should exhibit exactly the same pattern, but also by plates that need completely different crystal patterns, depending on the intended application. This clearly demonstrates the flexibility of the technique for crystal printing in general compared to other reported techniques that require fabrication of new stamps (W. Cheng, N. Park, M. T. Walter, M. R. Hartman, D. Luo, *Nature Nanotech.* 2008, 3:682) or micropillars (B. Su, S. Wang, J. Ma, Y. Song, L. Jiang, *Adv. Funct. Mater.* 2011, 21:3297) for obtaining different high-resolution crystal patterns.

Also described are microbeads containing molecules that are printed inside microwells by transporting a mother or parent droplets containing suspended microbeads over tailored hydrophilic-in-hydrophobic microwells. Suspensions of micro- to nanoparticles can then be transported over the array of hydrophilic-in-hydrophobic microwells many times, until virtually all microwells contain a single or multiple particles. This can be of high interest when these particles are used for capturing biomolecules. When very low concentrations of biomolecules are present in a sample, the ratio of biomolecules to particles used for capturing these biomolecules will be very low. In this case, Poisson statistics apply which means that maximum one biomolecule can be captured per particle. When these particles, that captured the biomolecules, are loaded inside the microwells, they can be printed inside a nano- to femtoliter volume. Moreover, when this is done in an oil environment, as described above, the particles are sealed in a femtoliter droplet and their evaporation is prevented. When the particles that contain the biomolecules are then printed and sealed in the oil, reaction products of these biomolecules can be confined to the hydrophilic element (well or patch). This is of high interest when enzyme linked immunosorbent assays (ELISA) is performed in this format, also called digital ELISA, as the fluorescent product of the ELISA test is confined to the printed nano- to femtoliter volume where it accumulates. As such, the signal intensity will be higher and can be detected with standard fluorescence microscopy and allows lower protein concentrations to be detected.

In the case of nucleic acids, polymerase chain reaction (PCR) is the most prominent method for detecting these nucleic acids. The same reasoning applies here, where low concentrations of nucleic acids (DNA or RNA) can be captured with particles, which can then be loaded inside the microwells. When performing quantitative PCR on nucleic acids captured on these particles, the fluorophores generated by this reaction can then also be confined inside the wells or patches. This then also leads to a more sensitive detection of said nucleic acids.

When the particles used for these assays are magnetic, the patterning time needed for printing these particles in the hydrophilic-in-hydrophobic arrays can be shortened by placing a magnet underneath the hydrophilic-in-hydrophobic arrays. As such, the magnetic particles are attracted towards the array while the receding droplet meniscus removes all particles that are between the hydrophilic elements. the apparatus presents the following advantages for printing and sealing magnetic particles (i) droplets containing suspended particles can be transported back and forth over the array of hydrophilic microwells to fill the microwells with single or multiple particles, (ii) the use of hydrophilic-in-hydrophobic patterns permits the use of a magnet to speed up the particle transfer process to the wells while the receding droplet meniscus removes excess beads off the chip surface and thereby shortens the bead patterning time, and (iii) reagents can be transported over the printed beads multiple times while capillary forces and a magnet hold the printed beads into place.

EXAMPLES

Example 1—On Single Crystal Array Formation

An aqueous NaCl solution (5 M) or was transported 20 times over an array of hydrophilic-in-hydrophobic micropatches, resulting in an array of single NaCl crystals (FIG. 4).

Example 2—Fabrication of an Array for Printing of Oligonucleotides and Aptamer Selection Digital microfluidic chips are fabricated as follows: glass wafers are cleaned in acetone and isopropyl alcohol for 5 minutes. A thin layer of chromium (100 nm) is then deposited by magnetron sputtering (Balzers BAE 370, Pfaffikon, Switzerland). The chromium layer is patterned by standard photolithographic processes using S1818 positive photoresist, chrome-on-glass photomasks, and wet etching using Cyantec CR-7 chromium etchant. Next, chips are cleaned in 02-plasma (150 mtorr, 100 W) and primed with silane A174 before being coated with a layer of Parylene-C (3 μm) which was deposited using chemical vapor deposition (AL 200, Plasma Parylene Coating Services, Rosenheim, Germany). A thin layer of TEFLON-AF® (~200 nm thickness, 3% w/w in Fluorinert FC-40) is subsequently spincoated (1200 rpm) on top of the Parylene-C layer, and baked for 5 minutes at 110° C., and 5 minutes at 200° C. Crenellated actuation electrodes of 1.4 mm×1.4 mm are used for actuation of individual droplets. The upper plate of the digital microfluidic device is fabricated by spincoating TEFLON-AF® (as above) on top of indium tin oxide-coated glass slides (Delta technologies Ltd., Stillwater, Minn., USA). Tape of 100 μm thickness is applied on the bottom plate of the chip as a spacer before closing the 2 plates in order to assemble the microfluidic device.

To immobilize hybridization probes, a Parylene-C mask is used for the micropatterning process. In order to establish good adhesion of the TEFLON-AF® layer to the underlying Parylene-C dielectric layer, the latter is first treated with a short 02-plasma treatment (60 W, 100 mtorr) before spincoating TEFLON-AF® on top. A mask of Parylene-C (about 1 mm) is subsequently deposited on top of the TEFLON-AF® layer via chemical vapor deposition (CVD). Next, a layer of thick protective SPR220-7 positive photoresist is spincoated (3000 rpm) on top of the Parylene-C mask, and baked for 5 minutes at 115° C. The layer of photoresist is then patterned by standard photolithography. The unprotected zones of the Parylene-C mask and the underlying TEFLON-AF® layer are selectively etched away with reactive ion etching using 02-plasma (100 W, 150 mtorr), while minimally affecting the Parylene-C dielectric layer underneath. The sacrificial photoresist is removed by rinsing the chips with acetone, isopropyl alcohol, and deionized water.

After deposition of the DNA hybridization probes, the Parylene-C mask is mechanically removed. Subsequently, a droplet containing the library is transported on the patch and hybridization is allowed for 2 hours.

Droplet actuation on the chip is controlled by Labview program.

Preparation of circular padlock probes containing the aptamer library: A solution of the phosphorylated linear library is treated with a solution of the ligation template in the Quick Ligation Kit buffer (New England Biolabs) at 25° C. for 30 minutes. The synthesis is completed with the Quick Ligation Kit, using the manufacturer-supplied protocol. The enzymes are denatured by heating at 65° C. for 10 minutes. The ligated circular library is then treated for 30 minutes at 37° C. with exonuclease I to degrade excess single-stranded primers that has not hybridized with the phosphorylated linear DNA. The enzymes are denatured by heating at 80° C. for 20 minutes. DNA template is isolated using a Centricon filtration device (30000 Da cutoff).

Library amplification by RCA: Ligated circular library is transported on the microfluidic chip and let hybridize for two hours. Then a droplet containing phi29DNA polymerase and dNTPs is transported on the patches. The RCA reaction is carried out for one hour at 30° C. The phi29 DNA polymerase is then denatured by heating at 65° C. for 10 minutes.

Following a washing step, a droplet containing IgE is transported on the amplified library patch and incubated for two hours at 37° C. Following another washing step, binding events are detected by labeling IgE with Alexa488-anti IgE antibodies in PBS for two hours at room temperature.

After three more washing steps, local fluorescence is detected and quantified. The spots with highest fluorescence intensity are targeted with the laser to cause local release of the RCA products.

The droplet containing a few aptamers is manually collected and used for restriction digestion to release individual aptamers. Digestion (EcoRI) is performed at 37° C. overnight.

DNA is purified from the restriction enzyme and the IgE by phenol-chlorohorm purification, then precipitated with Na acetate/ethanol and resuspended in TE buffer pH8.

According to one embodiment, the disclosure relates to a system for fast and semi-automatic isolation and selection of functional nucleic acids comprising pre-designed oligonucleotide libraries; a digital microfluidic chip; on-chip immobilization of the library via photo-cleavable linkers; on-chip amplification of the library using rolling-circle amplification; on-chip target binding; microscope assisted detection of binding events on the patches and laser-assisted release of oligonucleotide strands that have bound the target. The nucleotides can be positioned in an array on the digital microfluidic chip via the printer apparatus of the disclosure.

Conventional random libraries used for in vitro selection of functional nucleic acids contain only one or few copies of each sequence, which makes the binding for a target molecule (e.g., a protein or small chemical compounds) a completely random event. In addition, there is no control over the quality of these sequences. This disclosure uses in silico pre-designed library that have higher chances to yield nucleic acids that can bind target of interest because they contain a limited set of oligonucleotide sequences, which are selected for their ability to form highly stable 2D/3D structures. In addition, the library is immobilized and amplified hundreds of times on a digital microfluidic chip facilitating the binding between a give nucleic acid strand and the target. The nucleotide members of the members can be positioned for immobilization in an array structure by the flexible high-throughput method of the disclosure for the printing of solid-state materials (e.g., biomolecules such as proteins and polynucleotide (e.g., DNA) or nanoparticles). The system of the disclosure is adapted to deposit small liquid volume in the form of arrays of nano- to femtoliter droplet comprising the nucleotide to be attached by actively routing droplets over hydrophilic-in-hydrophobic micropatches and to a digital microfluidic high-throughput nano- to femtoliter droplets printer and allowing the solutes the materials to deposit and immobilize.

The target molecule for the selected aptamers can be a protein of interest, a biomarker, a pathogen, an environmental component or pollutant, an allergen, a small inorganic or organic compound.

Most manufacturers of nucleic acids can provide sequences adhering to in silico specifications. One such specification is by means of sequence templates. In such a template, for each position either a specific nucleotide is given, or a wildcard, meaning that any nucleotide is allowed in this position. A manufacturer synthesizes a large number of sequences for such a template, which will constitute the library used in vitro. The problem with in silico analysis of sequences is the too high number of possible nucleotide combinations. Therefore, the in silico analysis described in this disclosure is performed such that it delivers only a small number of templates (e.g., ten).

The key assumption is that templates comprises subsequences of specified nucleotides. To build promising templates, subsequences of nucleotides were identified that have desirable properties. To find such sequences, a procedure consisting of several key steps was initially implemented.

In the pre-designing method of the oligonucleotide libraries, first a number of sequences was generate. This is done suing sampling mechanisms as described in earlier work (Chushak and Stone, 2009) and in the disclosure we filter such sequences on properties that are assumed not to be present in sequences of interest. Second, we fold these sequences and score the resulting secondary structure using tools, such as mfold (Zuker, 2003), as an extension, we use docking algorithms to measure the binding affinity. Third, we use pattern mining tools to identify statistical relationships between highly scored sequences and subsequences present in these sequences.

Finally, constraint programming was used to define a subset of subsequences that is sufficiently diverse to ensure a desired range of secondary and 3D structures in the synthesized oligonucleotides and originate about $1*10^6$ different high quality sequences.

The library will be attached to the chip surface indirectly through binding to their complementary strands, here referred to as hybridization probes. Local functionalization or micropatterning of the chip surface with hybridization probes can be achieved in different ways.

To allow the immobilization of hybridization probes, it's vital to have micropatterns of a material that is more wettable (hydrophilic) than the matrix surrounding the micropatterns. This means that the contact angle of the material inside the patches has a lower contact angle. Another crucial factor is to preserve the hydrophobicity of the chip surface outside the micropatches.

Examples of materials suitable for micropatterning are glass, gold, indium tin oxide (ITO) in a background matrix of fluoropolymer material such as TEFLON®, CYTOP®, or FLUOROPEL®.

In the creation of micropatterns it is very important to create micropatches in high enough number to allow the positioning of a single nucleic acid sequence per patch and at the same time sufficiently spatially resolved to allow local release of only the desired nucleic acids strands.

For creating the micropatterns there are several possibilities.

A photolithographic method can be used where the hydrophobic material is locally etched away by means of standard microfabrication processes. Photoresist can be spincoated and patterned on top of the hydrophobic surface, and serve as an etching mask for the local removal of hydrophobic coating underneath (using dry etching such as oxygen-plasma etching).

A dry lift-off method as described in Witters et al., "Biofunctionalization of electrowetting-on-dielectric digital microfluidic chips for miniaturized cell-based applications," *Lab On a Chip* Vol: 11 No: 16, 2011, pp. 2790-2794. Here essentially a flexible mask (Parylene-C or PDMS) is deposited on top of the hydrophobic layer. This flexible mask protects the hydrophobicity of the film and enables an easy biofunctionalization of the patches because this method performs a mechanical lift-off, and doesn't make use any organic solutions or high temperature steps.

Hybridization probes are immobilized on a micropatterned chip surface with a photo-cleavable linker extension that allows laser assisted, site-specific release of the oligonucleotide strands.

Photocleavable linker can be a 2-nitrobenzyl group (X. Bai et al., "Photocleavage of a 2-nitrobenzyl linker bridging a fluorophore to the 5' end of DNA," *Proc. Natl. Acad. Sci. U.S.A.*, 2003, vol. 100(2), p. 409-13) or a phosphoramidite group.

For immobilization of the hybridization probes on the micropatterns there are several possibilities.

The most conventional format is using gold as a material for micropatches, and functionalizing these patches with appropriate self-assembled monolayers, e.g., COOH-SAMs that can couple amine modified hybridization probes. This method assures the directional immobilization of the probes.

An alternative format uses patches of poly-L-lysine, as it is used in DNA microarrays. Hybridization probes are adsorbed via electrostatic interaction with the amino groups of lysine. In this case there is no control over the direction in which the probes are immobilized.

An alternative format uses high positively charged aminosilane-coated glass or ITO surfaces for the attachment of COOH-modified probes. Most commonly aminopropyl silane is used. This method also assures the directional immobilization of the probes.

The disclosure describes the use of a nucleic acids library which is amplified on a micropatterned digital microfluidic chip. Library amplification can be achieved in multiple ways.

Pre-designed library is integrated into padlock probes, which are circular nucleic acid sequences, which contain a sequence complementary to the one of the hybridization probes. Padlock probes are amplified through a well-established technique named rolling circle amplification (RCA). Padlock probes serve as a template in RCA to create long, single-stranded DNA (ssDNA) chain containing thousands periodic repeats of the sequence coded for by the padlock probe (D. Liu et al., *J. Am. Chem. Soc.* 1996; 118(7):1587-1594). This results in numerous amplification (and thus over-representation) of the same sequence within the library. Previous work has demonstrated that RCA can be used to create a DNA scaffold containing aptamer repeats, which retain their structure and the capability to bind their target (Z. Cheglakov et al., *Angew Chem. Int. Ed. Engl.* 2008; 47(1):126-30).

In detecting the target binding to the amplified library it is crucial that signal is generated only in presence of the bound target and only in certain spots in which target-specific nucleic acids are immobilized. This can be achieved by several fluorescence-based methods, e.g., fluorescent antibodies against the target molecule, nucleic acid staining with intercalating dyes SybrGreen®), fluorophore-quencher coupling.

The fluorescence measurement can be performed with a number of different instruments, including standard fluorescence spectrophotometers, or in a small volume using a high-intensity source, such a laser, high-efficiency light collection optics, such as a high-numeric aperture microscope objective, and a high-efficiency low-noise detector, such as photo-multiplier tube, a photodiode, a cooled CCD camera or single-photon-counting detector.

Light ray necessary to cleave the photocleavable group is generated by a laser. Laser can be, e.g., an argon-ion laser that emits at nine discreet spectral lines between 458 nm and 530 nm, a helium neon laser that emits at 633 nm, or a diode laser that emits at 635 nm. Alternatively, ray can be another form of electromagnetic radiation generated by a source other than laser. For example, ray can be infrared, ultraviolet, or microwave.

Long RCA products, once released from the chip surface, will be collected for further characterization. Individual aptamers will be recovered from these long ssDNA sequences by endonuclease enzyme treatment and further tested for their binding specificity as well as for their binding affinity using techniques like capillary electrophoresis, fiber optic surface plasmon resonance and fluorescence anisotropy.

An embodiment of the disclosure relates to a platform for fast and semi-automatic isolation and selection of aptamers comprising the use of pre-designed oligonucleotide libraries, digital microfluidic chip, on-chip immobilization of the library via photo-cleavable linkers, on-chip amplification of the library using rolling-circle amplification, on-chip target binding and laser-assisted release of oligonucleotide strands that have bound the target.

Conventional random libraries are replaced by a limited pool of oligonucleotides designed and tested in silico for their ability to form highly stable 2D/3D structures. To find such a set of sequences, two types of methods are employed. First, a few promising sets of fragments in a large set of generated sequences are identified through pattern mining. Second, by the use of constraint satisfaction tools, a subset is selected that is sufficiently diverse to ensure a desired range of secondary and 3D structures in the synthesized oligonucleotides.

The digital microfluidic chip is micro-fabricated starting from an inverse master pattern designed using computer aided design (CAD) software. Based on this master pattern, the chip is produced by means of standard lithography techniques known in the art.

The library will be attached to the chip surface indirectly through binding to their complementary strands, here referred to as hybridization probes. Local functionalization of the chip surface with hybridization probes is performed by means of Parylene-C stencils with a dry lift-off method (Witters et al., 2011). The droplet manipulations across the chip surface, required to perform all the steps of the selection procedure, will be controlled by a Labview software program.

Hybridization probes are immobilized on a chip surface through a photo-cleavable linker extension that allows laser assisted, site-specific release of the oligonucleotide strands.

Photocleavable linker can be a 2-nitrobenzyl group (X. Bai et al., "Photocleavage of a 2-nitrobenzyl linker bridging a fluorophore to the 5' end of DNA," *Proc. Natl. Acad. Sci. U.S.A.*, 2003, vol. 100(2), p. 409-13) or a phosphoramidite group.

Light ray is generated by laser. Laser can be, e.g., an argon-ion laser that emits at nine discreet spectral lines between 458 nm and 530 nm, a helium neon laser that emits at 633 nm, or a diode laser that emits at 635 nm. Alternatively, ray can be another form of electromagnetic radiation generated by a source other than laser. For example, ray can be infrared, ultraviolet, or microwave.

Pre-designed library is integrated into padlock probes and amplified through isothermal amplification reaction, known as rolling circle amplification (RCA). Padlock probe is a circular oligonucleotide sequence which serves as a template in RCA to create long, single-stranded DNA (ssDNA) chain containing thousands periodic repeats of the sequence coded for by the padlock probe (D. Liu et al., *J. Am. Chem. Soc.* 1996; 118(7):1587-1594). This results in numerous amplification (and, thus, over-representation) of the same sequence within the library. Previous work has demonstrated that RCA can be used to create a DNA scaffold containing aptamer repeats, which retain their structure and the capability to bind their target (Z. Cheglakov et al., *Angew Chem. Int. Ed. Engl.* 2008; 47(1):126-30).

Binding of the target molecule will be detected by several fluorescence-based methods, e.g., fluorescent antibodies against the target protein, nucleic acid staining with intercalating dyes (SYBRGREEN®), fluorophore-quencher coupling.

The fluorescence measurement can be performed with a number of different instruments, including standard fluorescence spectrophotometers, or in a small volume using a high-intensity source, such a laser, high-efficiency light collection optics, such as a high-numeric aperture microscope objective, and a high-efficiency low-noise detector, such as photo-multiplier tube, a photodiode, a cooled CCD camera or single-photon-counting detector.

Following the identification of these binding events by fluorescence microscopy, candidate DNA strands will be released from the microfluidic chip in laser-assisted site specific manner through the photo-cleavable linker. Here, by setting a threshold in the fluorescence readout we will select for, e.g., one thousand of the best potential candidate sequences. Those will be submitted to next generation sequencing (NGS) to obtain the first insight into which sequences from predesigned library have been preferred by the real target binding. This information will be used for the development of learning algorithms and for further improvement of in silico library design.

Long RCA products, once released from the chip surface, will be collected for further characterization. Individual aptamers will be recovered from these long ssDNA sequences by endonuclease enzyme treatment and further tested for their binding specificity as well as for their binding affinity using techniques like capillary electrophoresis, fiber optic surface plasmon resonance and fluorescence anisotropy.

Other embodiments of the disclosure will be apparent to those skilled in the art from consideration of the specification and practice of the disclosure disclosed herein. It is intended that the specification and examples be considered as exemplary only. Each and every claim is incorporated into the specification as an embodiment of the disclosure. Thus, the claim(s) are part of the description and are a further description and are in addition to the preferred embodiments of the disclosure. Each of the claim(s) set out a particular embodiment of the disclosure.

Example 3—Hydrophilic-In-Hydrophobic Microwells

Hydrophilic-in-hydrophobic microwells were fabricated as follows. Glass slides were coated with TEFLON-AF® to a thickness of 3.25 μm. Next, a thin Parylene-C membrane (500 nm) was deposited on top of the TEFLON-AF® surface by using chemical vapor deposition. Subsequently, an aluminum hard mask (50 nm thickness) was deposited on top of the polymeric stack by thermal evaporation. This aluminum hard mask was patterned by standard photolithography and wet etching to obtain an array of circular features having 4 μm diameter. The exposed areas of the protective Parylene-C mask and TEFLON-AF® were then etched with reactive ion etching using 02-plasma before the protective Parylene-C mask was removed by mechanical peeling.

Figure 8:
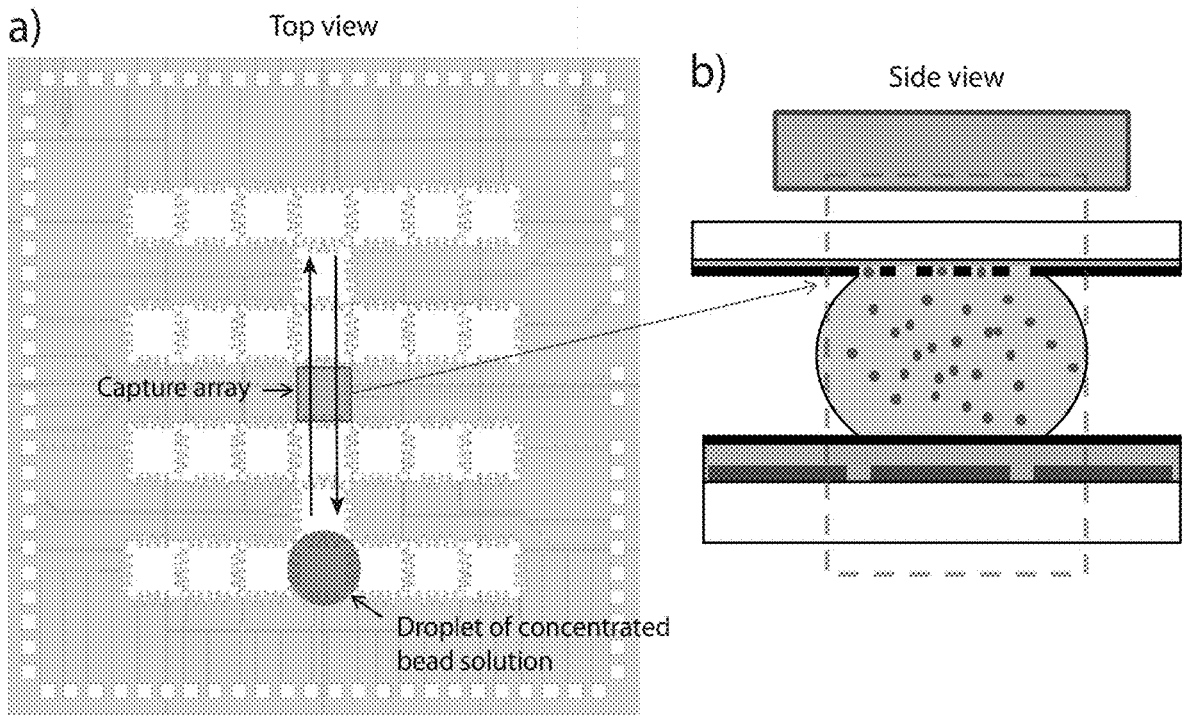
FIG. 8, Panel a), schematic is a top view and FIG. 8, Panel b), is a side view of a droplet containing suspended microspheres that is transported over a capture array of hydrophilic-in-hydrophobic microwells by using an electrowetting-on-dielectric microfluidic chip. By placing a magnet on top of the array, paramagnetic microbeads are fastly attracted inside the microwells.

The glass slide containing these hydrophilic-in-hydrophobic micropatterns was subsequently used as a top plate of a double-plate digital microfluidic chip based on electrowetting-on-dielectric (FIG. 8).

Figure 9:
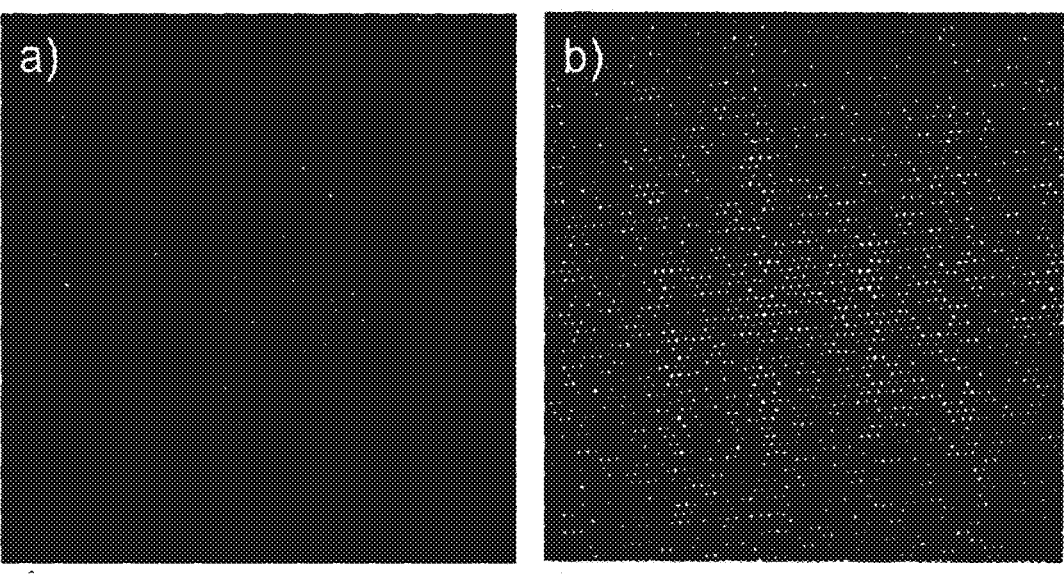
FIG. 9 Fluorescent images of fluorescently labeled paramagnetic beads patterned inside hydrophilic-in-hydrophobic microwells by using an electrowetting-on-dielectric based digital microfluidic chip by using magnet attraction. In Panel a), the mother droplet containing the suspended particles was shuttled over the array two times, while in Panel b), this droplet was shuttled over the array 10 times.
Figure 10:
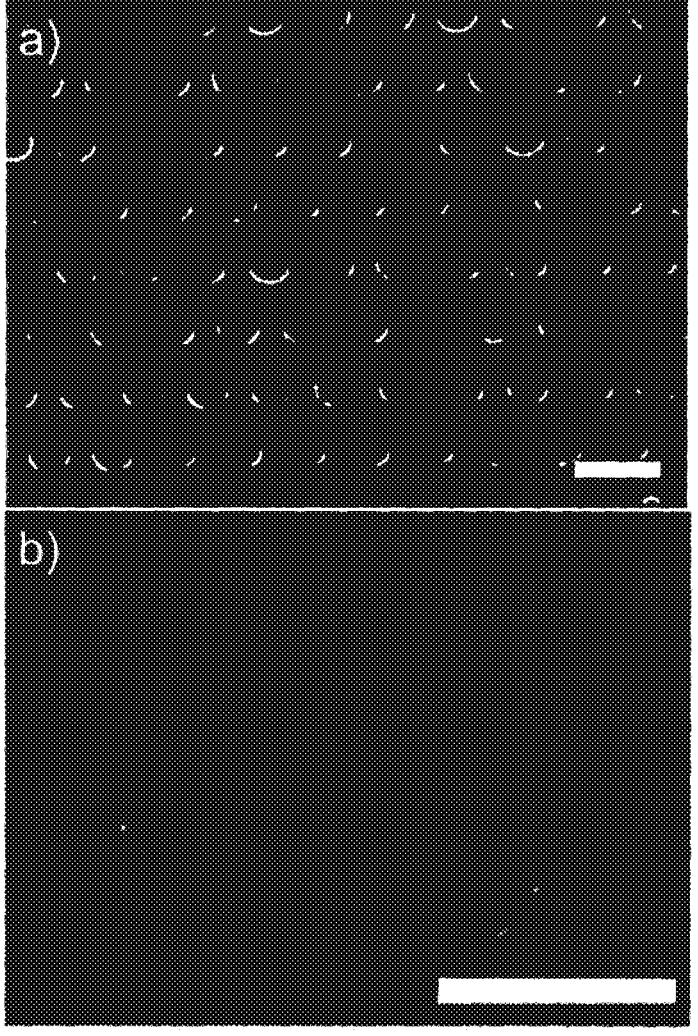
FIG. 10 SEM images showing single paramagnetic microbeads in hydrophilic-in-hydrophobic microwells. Scale bars are 8 μm (Panel a) and 3 μm (Panel b).

For demonstrating the principle of printing microbeads in femtoliter volumes, 2.7 μm sized paramagnetic beads were functionalized with green fluorescent protein (GFP) to be able to visualize them on a fluorescence microscope. First, a mother droplet of a suspension of these particles was transported over the capture array with hydrophilic-in-hydrophobic microwells without any magnet attraction. This resulted in poor filling of the microwells, even after 10 seeding cycles (FIG. 9, Panel a). However, when a suspension of these functionalized particles was transported 2, 5 and 10 times over an array while a magnet was placed on top of the digital microfluidics, the beads were attracted inside the microwells on a very efficient way. After 10 seeding cycles, virtually all microwells were filled with a single paramagnetic microbead (FIG. 9, Panel b). A SEM image demonstrating the high single bead per microwell resolution and high loading efficiency of beads in microwells is shown in FIG. 10. The printed beads in femtoliter volumes could effectively be sealed by performing all droplet manipulations in a silicon oil matrix. This is a crucial feature because when performing immunoassays, the printed femtoliter volumes should not evaporate in order to perform successful analysis.

The following terms are provided solely to aid in the understanding of the disclosure.

Definitions

A microfluidic chip as used in the disclosure, is typically a device comprising structural or functional features dimensioned on the order of mm-scale or less. The term "digital microfluidic chip," "digital microfluidic system," or "digital microfluidic device" as, for instance, used herein generally refers to a chip, system, or device which can incorporate a plurality of electrodes through which liquid droplets can be transported to execute one or more preparative or analytical manipulations. Droplet transportation on the chip can, for instance, by electrowetting on Dielectrics (EWOD)-based devices. Such devices are, for instance, fabricated by the microfabrication techniques of the art. Generally, a EWOD-based device comprises a layer of conductive material patterned in the form of electrodes that is covered by layers of dielectric (e.g., silicon dioxide, silicon nitride, parylene) and hydrophobic (e.g., TEFLON®, CYTOP®) materials. By controlling the voltage at each respective electrode, the surface tension (surface energy) can be reversibly manipulated, causing fluid to move in the energetically favorable direction. For example, droplets can be created, merged, moved, cut, etc., in a reprogrammable fashion using the appropriate actuation sequence. EWOD-based devices are able to create, transport, cut and merge droplets in a microfluidic environment. For example, the fundamental operations and structures used in EWOD-based devices is described in Cho et al., "Creating, Transporting, Cutting, and Merging Liquid Droplets by Electrowetting-Based Actuation for Digital Microfluidic Circuits," *Journal of Microelectromechanical Systems*, Vol. 12, No. 1, February 2003, pp. 70-80. The aforementioned reference describes common configurations for EWOD although other EWOD configurations may also be used (e.g., coplanar EWOD, EWOD with ground wire, etc.).

The digital microfluidic chip is micro-fabricated starting from an inverse master pattern designed using computer aided design (CAD) software. Based on this master pattern, the chip is produced by means of standard lithography techniques known in the art.

Where "flexible high-throughput method for the printing" is mentioned, the term "Flexibility" refers to the transport of mother droplets, which can easily be controlled and reconfigured by applying the proper software-controlled actuation sequence to the actuation electrodes when using electrowetting-on-dielectric.

Where "to print large amounts of small liquid droplets" is mentioned the printing of droplets can go from printing of 100 picoliter droplets per second, till the printing of 12800 femtoliter droplets per second when actuation electrodes of 2.8 mm×2.8 mm and square hydrophilic micropatches of 5 μm×5 μm are used.

Where "generate large arrays of very small volumes" is mentioned, it is noted that the exact amount of droplets that is printed per second depends on the size of the mother droplet and the dimensions of the hydrophilic micropatches that are used (cfr. Previous comment). Where "exhibiting several contact angles" is mentioned, it is noted that the contact angle of the micropatches can be changed by altering the material or structure of the material inside the hydrophilic micropatches.

Where "hydrophilic-in-hydrophobic micropatches" has to be mentioned, some of the hydrophilic materials display a contact angle <90°, such as glass, indium tin oxide, or most metallic materials. On the other hand, some hydrophilic materials can exhibit a contact angle equal to or higher than 90°, such as Parylene-C, gold, or plastic materials.

Where "micro- to nanowells fabricated inside the hydrophobic layer," this means that the hydrophilic micropatches can have a thickness ranging from <5 nm (such as different self-assembled monolayers) or up to 100 μm, depending on the type and application method of the coating. An example of a thick coating can be a spincoated hydrophobic polymer layer such as TEFLON-AF®.

Where "droplet actuation mechanism, which are active or passive" is has to be noted that an active droplet actuation mechanism uses external energy to move the mother droplet, such as, but not excluded to, electrical forces. A passive droplet actuation mechanism does not rely on external energy and can, for instance, be based on droplet guidance by means of surface tension forces.

Particular and preferred aspects of the disclosure are set out in the accompanying independent and any dependent claim(s). Features from the dependent claim(s) may be combined with features of the independent claims and with features of other dependent claims as appropriate and not merely as explicitly set out in the claims.

Thus, the claims following the detailed description are hereby expressly incorporated into this detailed description, with each claim standing on its own as a separate embodiment of this disclosure.

What is claimed is:

1. A device for printing an array of liquid droplets, the device comprising:

at least one plate comprising an array of actuation electrodes;

a surface having an array of microwells, and a magnet or an assembly of magnets positioned underneath the array of microwells, wherein a plurality of actuation electrodes are configured to transport a parent droplet along the surface on a path proximate the array of microwells, wherein each actuation electrode is configured to actively address a fraction of the surface corresponding to the actuation electrode, wherein transporting the parent droplet proximate the array of microwells causes divisional droplets to form in the array of microwells from the parent droplet, and wherein each divisional droplet corresponds to a microwell in the array of microwells, and a volume of each divisional droplet is less than a volume of the parent droplet.

\*    \*    \*    \*    \*